Sept. 10, 1940.  J. A. ROCHE  2,213,967
TAIL WHEEL ASSEMBLY
Filed Jan. 22, 1938  5 Sheets-Sheet 1
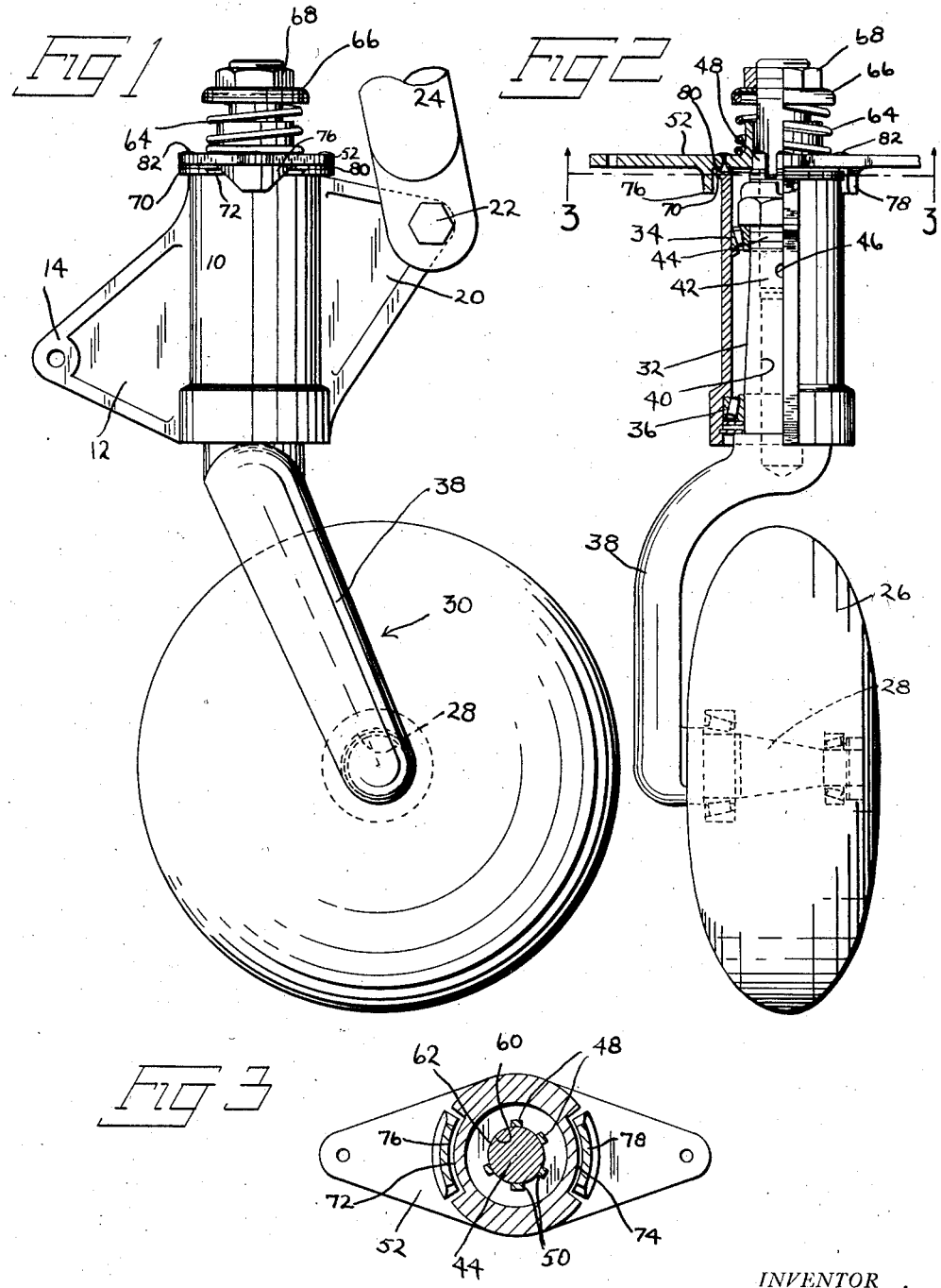
INVENTOR
JEAN A. ROCHE
BY Robert V. Loughlin
and Wade Koontz
ATTORNEYS

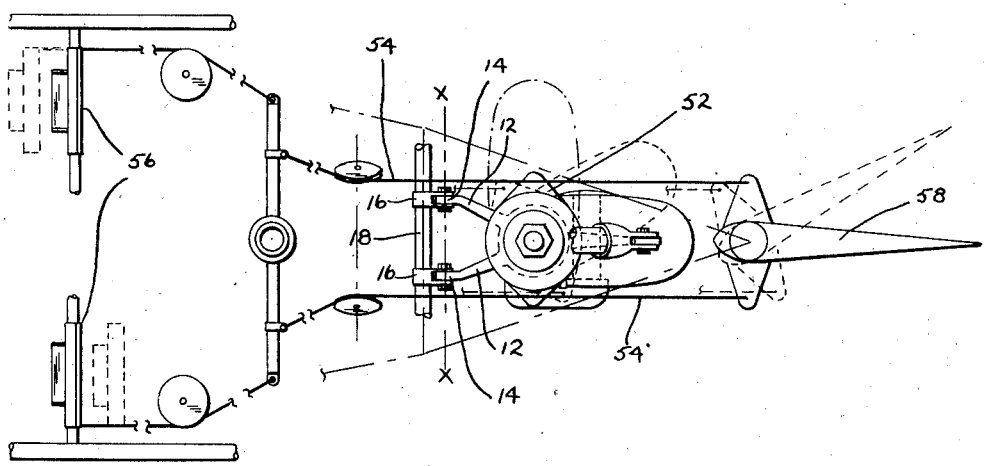
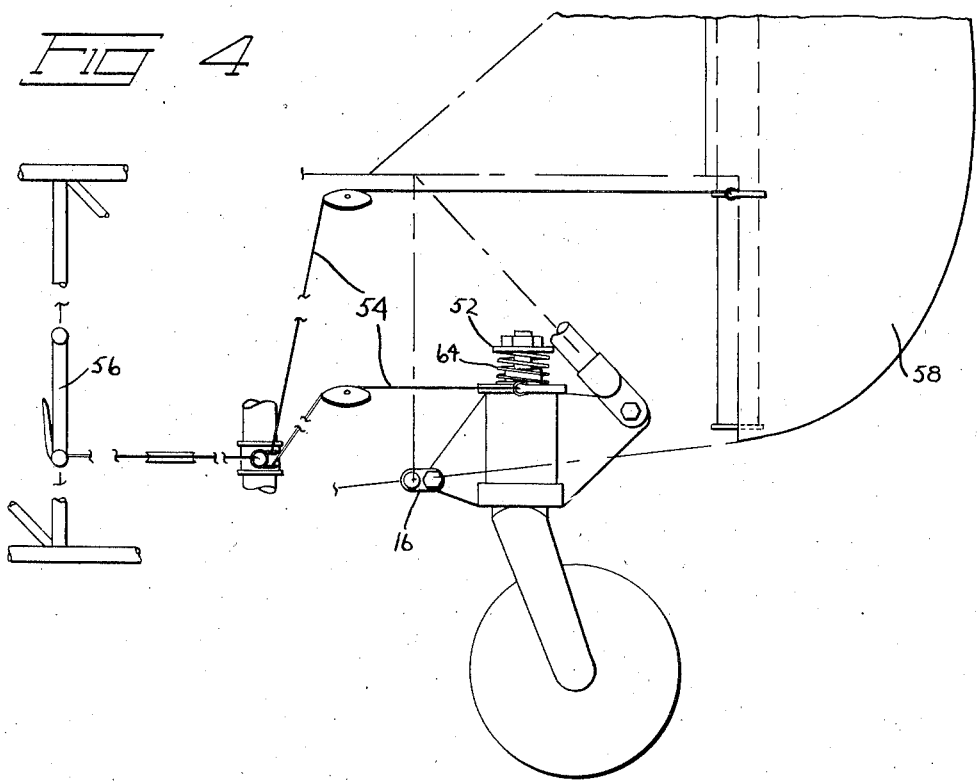

Sept. 10, 1940.   J. A. ROCHE   2,213,967
TAIL WHEEL ASSEMBLY
Filed Jan. 22, 1938   5 Sheets-Sheet 3
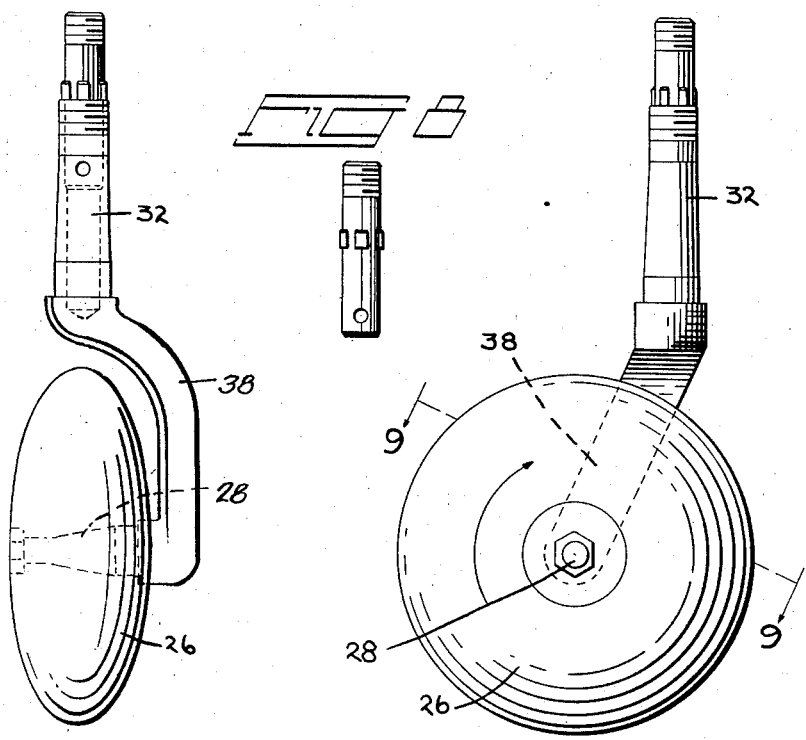
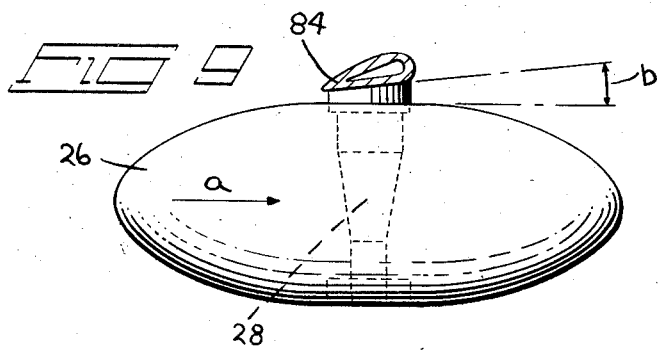
INVENTOR,
JEAN A. ROCHE
BY Robert V. Laughlin
Clade Koontz
ATTORNEYS Sept. 10, 1940.  J. A. ROCHE  2,213,967
TAIL WHEEL ASSEMBLY
Filed Jan. 22, 1938  5 Sheets-Sheet 4
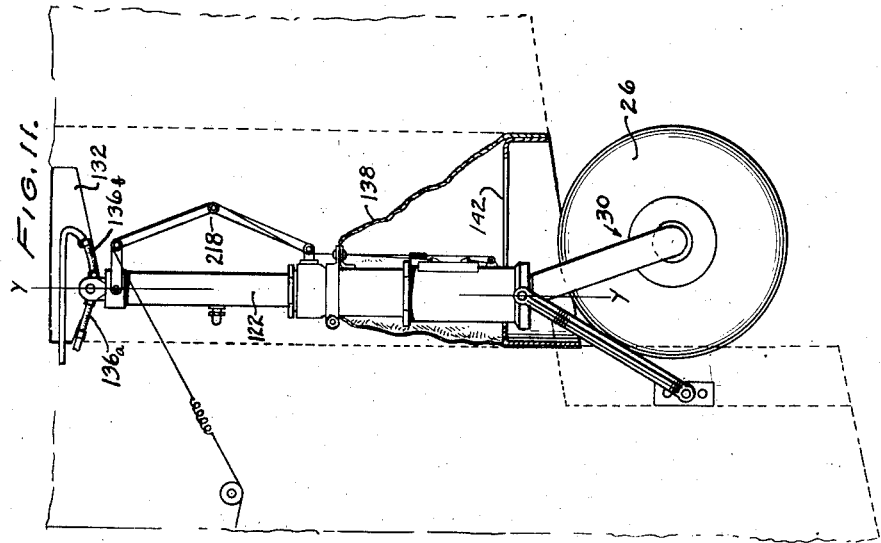
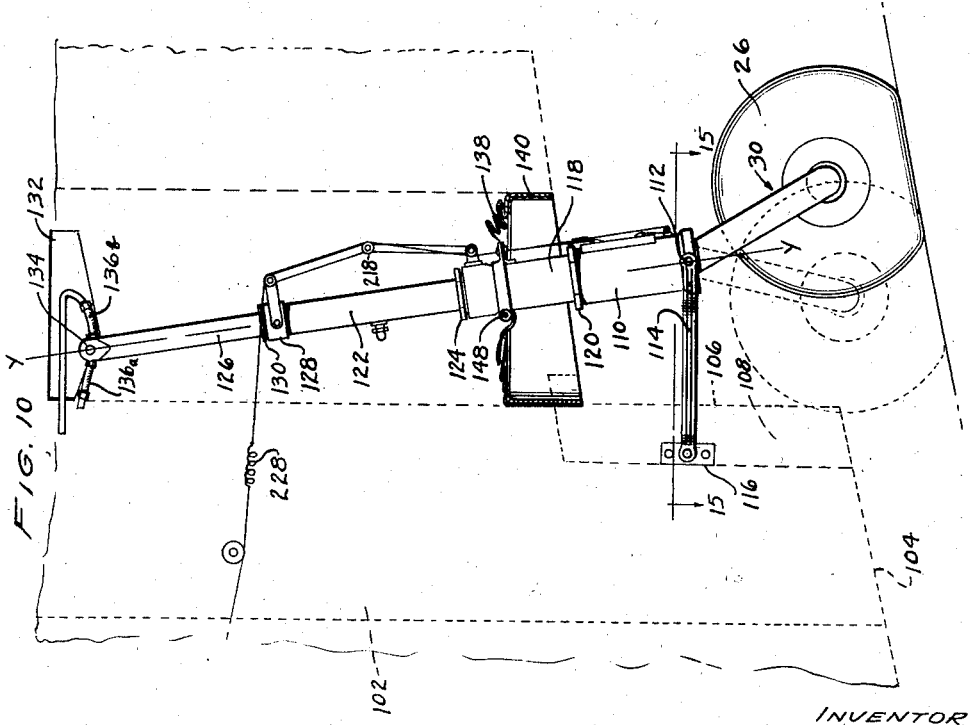
INVENTOR,
JEAN A. ROCHE Sept. 10, 1940.  J. A. ROCHE  2,213,967
TAIL WHEEL ASSEMBLY
Filed Jan. 22, 1938  5 Sheets-Sheet 5
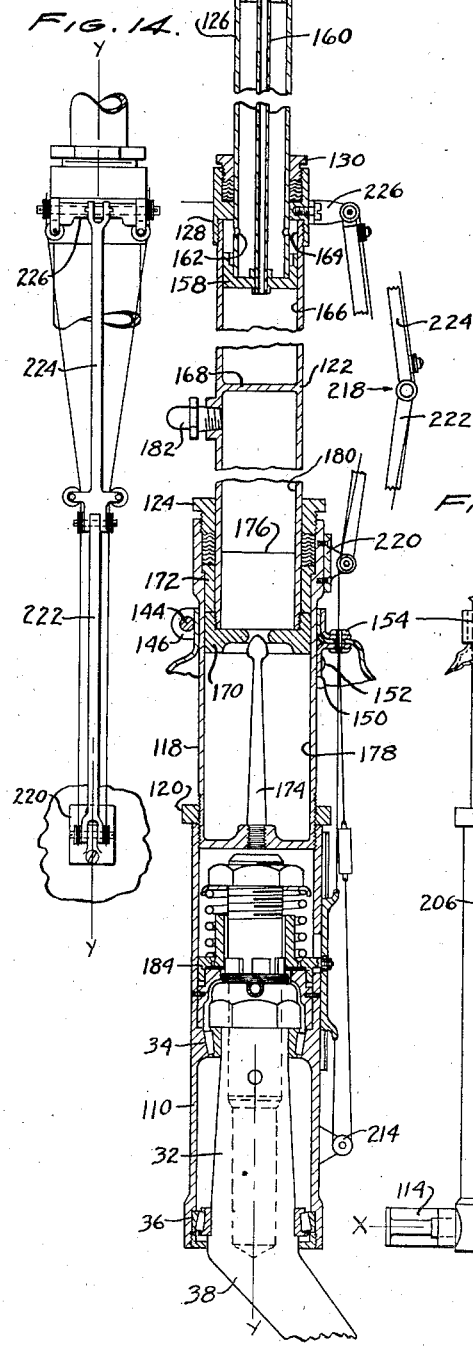
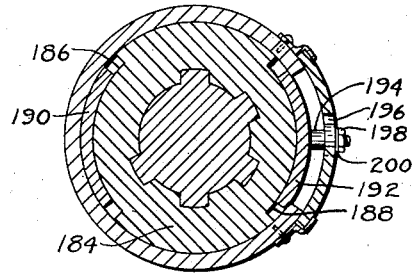
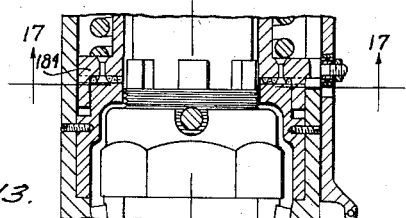
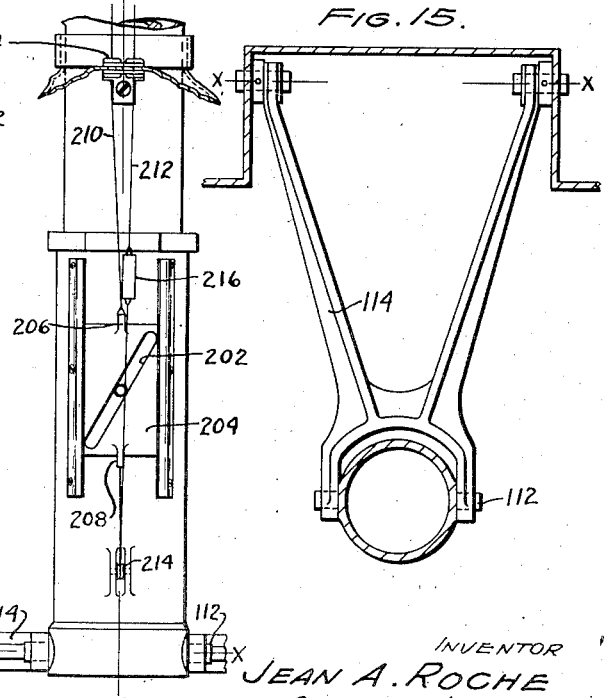
INVENTOR
JEAN A. ROCHE
ATTORNEYS Patented Sept. 10, 1940

2,213,967

UNITED STATES PATENT OFFICE 2,213,967

TAIL WHEEL ASSEMBLY

Jean Alfred Roché, Dayton, Ohio

Application January 22, 1938, Serial No. 186,377

30 Claims. (Cl. 244—109)

(Granted under the act of March 3, 1883, as amended April 30, 1928; 370 O. G. 757)

The invention described herein may be manufactured and used by or for the Government for governmental purposes, without the payment to me of any royalty thereon.

The present invention, which relates generally to aircraft and more particularly to an aircraft tail wheel assembly, is a continuation, in part, of my co-pending application, Serial No. 26,436, filed June 13, 1935.

I am aware that in prior art developments, tail wheels for airplanes have been provided which could freely swivel through 360 degrees of angular movement, but in the majority of these instances the tail wheel is not steerable; in still other instances the tail wheel has been directly connected with the rudder control arm so as to be movable in unison therewith.

However, in the examples cited above, no attempt has been made to combine freedom of swiveling movement and absolute controllability in steering of the tail wheel under certain desired conditions. Positive control of the tail wheel during taxiing along the ground prior to take-off or in landing is highly desirable under certain conditions of flight. For example, ground loops may be effectively prevented by proper steering of the tail wheel if positive control thereof under predetermined conditions is made possible.

Conversely, it may be found desirable that the tail wheel be freely swivelable in order to make possible a sharp turn in taxiing for take-off or in parking the airplane within its hangar.

The primary object, therefore, of the present invention is to provide an improved tail wheel assembly wherein the tail wheel is positively steerable through a predetermined or limited range of angular movement of the rudder and yet which may, on occasions, swivel freely through 360 degrees of angular movement.

A further object of the present invention is to provide in a tail wheel assembly of this character, means for positively connecting a swiveling tail wheel to the rudder control arm of an aircraft and including further means operating in such a manner as to effect an automatic disengaging of the tail wheel from the rudder control arm under excessive loads or when it is desired to effect a turn of the aircraft within a smaller radius of operation than the normal range of operation of the rudder of the aircraft.

A still further object of the present invention is to provide a tail wheel assembly for an aircraft in which friction means is provided to prevent objectionable oscillation or shimmying of the tail wheel when the aircraft is taxiing along the ground, as well as in flight, said means being operative only when the rudder control arm and tail wheel are directly coupled together.

A specific object of the present invention is to provide a tail wheel assembly which normally is steerable from the cockpit of an aircraft but which, due to its novel construction, is capable of being readily swiveled about its mounting post by an attendant on the ground. Obviously, such an arrangement is highly desirable, especially when occasions require a shifting of the aircraft within the confining limits of a hangar, primarily by reason of the fact that by merely pushing the tail of the aircraft sidewise in the desired direction, a castering action of the tail wheel will be obtained without requiring the person's presence in the cockpit to disengage the tail wheel from the rudder, the disengagement being not only automatic and occurring as soon as the rudder has reached the predetermined range of travel, but simultaneously with the rendering inoperative of the friction means.

A still further object of the present invention is to provide in a tail wheel assembly of the above character, an improved tail wheel knuckle, including a streamlined strut portion of substantially airfoil shape in cross section which follows the contour of the landing wheel, the trailing edge of which is closer to the wheel than any portion forwardly thereof, to not only scrape the excess of mud from the wheel during its rotation but also provide an increasing clearance between the wheel and the forward portions of the strut and thereby eliminate any tendency of the wheel becoming locked.

A further specific object of the present invention is to provide a tail wheel assembly wherein there is provided a tail wheel knuckle having a splined upper end adapted for engagement in the splined portion of a rudder control arm, the splined end portion of the knuckle being readily replaceable in the knuckle in the event of breakage of the spline teeth.

A still further specific object of my invention is to provide means for installing a tail wheel assembly incorporating my improved tail wheel knuckle under the hull and aft of the step of an amphibian body, in such a manner that when the shock absorber supporting the same is in extended position, for landing operation, the tail wheel carried by said knuckle may be swivelled 360 degrees; while at the same time assuring that the tail wheel when in retracted position, for water operation, is shielded from the lower portion of the hull so as to offer a minimum of resistance when in flight or during the process of water take-off.

It is another object of the invention to accomplish the above enumerated features with a structure of marked simplicity; that is, one containing a minimum number of parts, elements or joints.

A further object of the invention is to combine into a single and compact unit, a tail wheel knuckle supporting a shock absorbing oleo and a retracting oleo, the latter to be operated by the same fluid pressure system provided for extension and retraction of the main landing gear.

With the foregoing and other objects in view, which will appear as the description proceeds, the invention consists of certain new and novel improvements in tail wheel assembly which will be hereinafter more fully illustrated in the accompanying drawings and more particularly pointed out in the appended claims.

Referring to the drawings, in which numerals of like character designate similar parts throughout the several claims:

Fig. 1 is a side elevational view of the tail wheel assembly;

Fig. 2 is a rear view partly in section of Fig. 1;

Fig. 3 is a sectional view taken on the line 3—3 of Fig. 2;

Fig. 4 is a diagrammatic view of a portion of the tail of an airplane including the tail wheel assembly and control apparatus for the rudder with which the tail may be steered;

Fig. 5 is a top plan view of Fig. 4;

Fig. 6 is a front elevation of the wheel knuckle, per se;

Fig. 7 is a side elevation of Fig. 6;

Fig. 8 is a detail view of the removal spline plug of Fig. 6;

Fig. 9 is a sectional view taken on the line 9—9 of Fig. 7;

Fig. 10 is a side elevational view of my invention applied to the lower rear portion of an amphibian body, showing a tail wheel in extended position;

Fig. 11 is similar to Fig. 10, except that the tail wheel is shown in retracted position;

Fig. 12 is an enlarged side elevation of the central portion of Fig. 10 partially in section;

Fig. 13 is a front elevation of the lower portion of Fig. 12;

Fig. 14 is a rear elevation of the control cable take-up device of Fig. 12;

Fig. 15 is an enlarged plan view of the drag link of Figs. 1 and 2;

Fig. 16 is an enlarged side elevation of the mid-portion of the wheel knuckle spindle; and Fig. 17 is a sectional view taken on the line 17—17 of Fig. 16.

Referring to Figs. 1 through 9, my tail wheel assembly is seen to comprise generally a housing 10, which forms a means of mounting the tail wheel on the tail structure of an airplane. The housing 10 is preferably of forged construction and formed with a pair of forwardly extending arms 12 provided with bearing portions 14 at their outer ends which engage suitable bracket members 16 carried by a cross brace 18 of the tail structure so as to permit swinging movement of the housing 10 about the horizontal axis x—x.

The housing 10 is also formed with a secondary rearwardly extending arm 20, which is pivotally connected as at 22 to the lower or movable strut end 24 of an oleo shock absorbing element, which is connected at its upper end (not shown) to the tail structure of the airplane.

Referring more particularly to Fig. 2, I have shown a ground engaging means or tail wheel 26 rotatably secured to the horizontal axle portion 28 of a tail knuckle generally indicated by the numeral 30. In Figs. 1, 2, 4 and 5, the tail wheel 26 is shown in "normal position"; i. e., its axle portion 28 is normal to the longitudinal axis of the aircraft to which it is attached. This knuckle is provided with a post or spindle portion 32, which is rotatably mounted in the housing 10 by means of upper and lower thrust bearings 34 and 36 respectively. As shown more particularly in Fig. 2, the main body portion 38 of the knuckle 30 is shaped to follow the contour of the tail wheel so as to readily scrape excess accumulations of mud from the tail wheel occasioned while taxiing over muddy ground.

It should also be noted by observing Fig. 1 that the main body portion 38 is also suitably shaped so that the axle portion 28, upon which the wheel rotates, is offset a sufficient distance from the spindle axis as to permit free swiveling movement of the tail wheel in a horizontal plane.

The spindle portion 32 is provided with an internal bore 40 adapted for receiving the plunger end 42 of a removable splined member 44. This member is normally fixedly secured to the spindle portion 32 by means of a removable pin 46.

The external spline teeth 48 of the splined member 44 are adapted for slidable engagement in the internal spline teeth of a rudder operating arm or steering mast 52, which in Figs. 1 through 5 is shown in "normal position"; i. e., its longitudinal axis is normal to the longitudinal axis of the aircraft intended to support the same. The mast 52 is operatively connected to cables 54 interconnecting the rudder controls 56 and the rudder 58 of the aircraft. In Figs. 4 and 5, the rudder 58 is also shown in "normal position."

The internal and external spline teeth of the steering mast 52 and splined member 44, respectively, are selective in character. To this end, as more particularly illustrated in Fig. 5, instead of providing the conventional plurality of equidistant radially disposed spline teeth, I provide a blank portion of the splined member 44 indicated by the numeral 60 wherein a normally disposed spline tooth has been eliminated, which registers with a similar blank portion 62 on the steering mast. Consequently, it will be observed that the splined connection between the steering mast 52 and spindle portion 32 is only obtainable when a predetermined relative position exists between the tail wheel and steering mast.

The operative connection between the steering mast and tail wheel is normally maintained by means of a compression spring 64 which bears at its lower end against the steering mast 52.

The spring surrounds the upper portion of the splined member 44 and is held under adjustable compression against the steering mast by means of a cupped washer 66 and adjusting nut 68, which is in threaded engagement with the upper end of the spindle portion 44.

The housing 10, heretofore mentioned, is provided with an upper circular flanged portion 70 formed with oppositely disposed cut-away sections 72 and 74 in which are normally disposed cam projections 76 and 78, which are formed integral with and depend from the steering mast 52, heretofore mentioned. As shown more particularly in Fig. 1 and Fig. 3, and with the steering mast and tail wheel in normal operative engagement, sufficient clearance is provided between the cam projections on the steering mast and the cut-away sections on the housing flanged portions so as to permit a predetermined range of angular conjoint movement of the steering mast and tail wheel before the cam projections will engage the sides of the cut-away sections 72 and 74.

When the steering mast has moved through this predetermined range of angular movement, or has been moved into the dotted position illustrated in Fig. 5, the steering mast 52 will have been moved bodily upward by reason of the camming action between the projections 72 and 74 and the sides of the cut-away sections 72 and 74 to effect a relative disarrangement between the steering mast and the knuckle 30 and permit free swiveling movement of the tail wheel beyond the predetermined range.

To prevent excessive oscillation of the tail wheel when the airplane is taxiing along the ground, a brake mechanism is provided. As shown more particularly in Fig. 2, this mechanism comprises essentially a disc 80 of suitable material having a high coefficient of friction, which is suitably secured on the lower face of the steering mast 52 by means of rivets 82. This disc, through the medium of the spring 64, heretofore mentioned, is held in adjustable frictional engagement against the upper surface of the circular flanged portion 70 of the housing. Obviously, by screwing or unscrewing the adjusting nut 68 the braking action of the friction material may be varied to suit various conditions.

Figs. 6 to 9, inclusive, illustrate in detail the present preferred form of constructing the tail knuckle heretofore mentioned. In Fig. 9, it will be observed that the main body portion 38, or that portion of the knuckle which is intermediate and integral with the horizontal axle portion 28 and the spindle portion 32, is substantially of streamline shape in lateral cross section with its trailing end portion 84 wedge shaped. Consequently, as the wheel 26 is rotated in the direction $a$ caused by its engagement with the ground, should mud or stones cling to the sides of the wheel, the excess thereof will be scraped from the wheel so as to permit the wheel to rotate freely. It is also to be observed that the trailing edge of the intermediate portion is closer to the side of the wheel than any portions forward thereof so as to form in effect a slight angle $b$ with respect to the sides of the wheel. Obviously, such an arrangement insures freedom of rotation of the wheel by reason of the fact that the mud remaining on the wheel after passing the trailing end 38 can not become jammed between the wheel and intermediate portion and prevent its rotation.

From the foregoing description, it will be observed that I have provided a simple and effective tail wheel assembly wherein means has been provided for obtaining a positive yet yieldable connection between the rudder operation means and the tail wheel during taxiing of the airplane along the ground prior to take-off or upon landing and incorporating braking means, which prevents objectionable oscillation or shimmying of the tail wheel during said taxiing movements.

It will be further noted that I have provided an arrangement of means allowing for free and unbraked castering movement of the tail wheel upon angular displacement of the tail wheel or steering mast beyond a predetermined angular range of movement and including further means operating to automatically restore the positive connection between the tail wheel and rudder operating means only when the rudder operating means is in normal orientation with respect to the tail wheel and to simultaneously re-establish the braking action against oscillation of the tail wheel.

In Figs. 10 through 16, I have provided new and novel means for attaching the first embodiment of my invention to the lower rear portion of an amphibian hull or body 102, shown in dotted outline, which outline further includes a bottom portion 104, a step 106, and a vertical recess 108. Reference to Figs. 2 and 12 through 14 indicates that original housing 10 (redesignated as "110") remains substantially unchanged from proximity of the upper thrust bearing 34 downwardly, the principal change consisting in replacement of the forwardly extending arms 12 by two outwardly projecting trunnions 112 and substitution for the bearing portions 14 of a drag link 114. It will be further noted that original bracket members 16 are replaced by two supporting brackets 116 (directly attached to the vertical recess 108) such that both housings 10 and 110 may be rotated in an upwardly, forwardly direction. Use of the trunnions 112, however, makes possible a substantially upright attitude of the housing 110, whether the tail wheel 26 and supporting tail knuckle 30 are extended as indicated in Fig. 10 or retracted as indicated in Fig. 11. In the former position, the aforesaid parts are free to execute 360 degrees rotation about the vertical axis $y$—$y$.

The manner and means by which I effect new and novel tail wheel extension and retraction is best understood by reference to Figs. 10 and 11. The upper extremity of the housing 110 is tapped to receive the threaded lower end of a cylinder member 118 fixed against rotation by the lock nut 120. A second piston-cylinder member 122 is held in telescoped relation with the cylinder member 118 by means of a packing gland nut 124. A third piston member 126 is similarly held in further telescoped relation with said piston-cylinder member 122 by means of a combined guide collar-packing gland 128 and packing gland nut 130. Through the new and novel nested telescopic arrangement of the three members just described, I am able to provide in a single compact unit certain basic working elements of both a hydraulic pressure-actuated retracting and extending means and a shock absorbing means and at the same time retain complete independence of means of operation, one from another. The upper end of the piston member 126 is rotatably secured to the amphibian hull or body 102 by means of a fitting 132 and pin 134 and is further operably interconnected to the fluid pressure system provided for extension and retraction of the main landing gear (not shown) by means of flexible fluid carrying lines 136$a$ and 136$b$.

Figs. 10 through 13 indicate one method by which ingress of water, within the amphibian hull or body 102, may be readily prevented without in any wise intefering with the operating characteristics of members 118—122—126. A water-proof sleeve 138 is sealed tight (at its lower extremity) to the outer diameter of an inverted well 140. The inverted well 140 is provided with an enlongated slot 142 to assure complete freedom of fore-and-aft movement of the cylinder member 118 and the housing 110. The upper extremity of sleeve 138 is sealed to the cylinder member 118 by means of a C-clamp 144, bolt 146 and nut 148. To permit cable ingress-egress, a secondary bracket 150, a rivet 152 and two grommets 154 are further provided, as best shown in Figs. 12 and 13.

The detailed structure of the piston member 126 and the upper half of the combined piston-cylinder member 122 (comprising the hydraulic retracting and extending means) is shown in cross-section in Fig. 12. This piston member 126 is sealed at its upper extremity by a combined support-fluid inlet fitting 156 and at its lower extremity by a piston fitting 158. A central tube 160 provides fluid ingress-egress from the line 136a to the bottom surface of the fitting 158, two holes 162 further providing for like fluid flow from the line 136b to the top surface of the fitting 158. Thus, pressure increase in chamber portion 164 of the piston member 126 will cause retraction of the tail wheel knuckle 30 and attached tail wheel 26 into the positioning of Fig. 11, while like pressure increase in chamber portion 166 of the piston member 126 will cause extension of the same parts into the positioning of Fig. 10. It should be noted that employment of a liquid medium for hydraulic actuation of the piston member 126 and combined piston-cylinder member 122 assures that these members are "hydraulically locked" against yielding to secondary longitudinal load forces.

Like detailed structural arrangement of the combined piston-cylinder member 122 and the cylinder member 118 (comprising the shock absorbing means) is shown in cross-section in Fig. 12. That portion of the member 122 lying below partition 168 terminates in a combined orifice-piston fitting 170. A filler block 172 limits upward movement of the fitting 170, while a metering pin 174, screwed fast to the base of the cylinder member 118, provides for metered flow of a liquid 176 from chamber 178 of the cylinder member 118 into chamber 180 of the piston-cylinder member 122. A fluid ingress fitting 182 is further provided upon the mid-forward face of the member 122.

Joint reference to Figs. 2, 3, 12, 16 and 17 indicates that I have retained, in the second embodiment of my invention, the steerable, limited frictional and remaining free swivelable features of the first embodiment of my invention. I have made minor changes in the original rudder operating arm or steering mast 52, (redesignated "184") to permit installation of the same within the inner confines of the housing 110. The cutaway sections 72 and 74, as well as the cam projections 76 and 78 (shown in Figs. 1 through 3, are redesignated "186," "188," "190" and "192," and remain unchanged in operating characteristics over the original structures. The steering mast 184 is provided with an arm 194, a ball bearing 196, a nut 198 and lock washer 200, adapted to be slidingly engaged by a diagonal slot 202 of a longitudinally actuated central plate 204. The latter plate is provided with ears 206 and 208 for attaching flexible cables 210 and 212. The cable 212, which passes over a pulley 214 and from thence through one of the grommets 154, includes a counterweight 216. The other cable 210 passes directly through the remaining grommet 154.

Since relative movement between members 122 and 118 causes constant variation in control cable lengths, a cable take-up device 218 is provided between the upper ends of the aforesaid members.

The cable take-up device 218 is best shown in Figs. 12 and 14. It consists of a lower support 220, a lower arm 222, an upper arm 224 and an upper support 226, as well as variously disposed guide pulleys 214 and appropriate retaining pins. The cable course is clearly shown and requires no special comment herein. From the uppermost two pulleys 214, the cables 210 and 212 pass over a further system of pulleys to the pilot's rudder control. To assure the absence of cable slack, during passage of the device 218 from the position shown in Fig. 10 to the position shown in Fig. 11, take-up springs 228 are introduced just forward of the piston member 126.

In connection with the free swivelable feature of my invention, it should be noted that sudden side-wise deflections of the tail wheel 26, during take-off or sharp taxiing turns by means of full brake application to either the right-hand or the left-hand main landing wheel plus sudden engine power application, will cause the movable part of the assembly, including arms or steering masts 52 or 184, to be rotated and at the end of the steering range the splined steering arm will be cammed upwardly, disengaging the same from splined engagement with the post or spindle portion 32. By virtue of the angular momentum generated, the steering arm will be rotated somewhat beyond the point of disengagement past the sloping part of the flange notch, and will come to rest on the flat face thereof. In this condition, the airplane may turn sharply as long as desired by the pilot, control of the turning radius being achieved by use of brakes on the right and left main wheels or rudder. When the pilot ceases to cause the airplane to turn and allows it to move substantially forward, the tail wheel begins to trail, and any movement of the steering pedals towards the center of the steering range returns the mast cams to the notch and the mast drops off the flange until its splines rest on top of the port splines, or drop into them, depending upon the relative positions of the tail wheel and the steering mast.

Although the foregoing description is specific to the illustrations in the drawings, it is to be understood that there may be numerous departures therefrom which will still be within the field and scope of my invention, so that I do not wish to be restricted thereto, but only in so far as the appended claims are so limited.

What I claim is:

1. The combination in an aircraft having a rudder and means for actuating said rudder, of ground engaging means including a mounting member vertically movable with respect to said aircraft, means operatively connecting said rudder actuating means with said ground engaging means for movement therewith through a predetermined range of angular departure from normal, adjustable means for braking angular movement of said ground engaging means within said predetermined range of departure and means for disengaging said rudder actuating means and said braking means from said ground engaging means by angular movement of the last mentioned means beyond said predetermined range of departure.

2. The combination in an aircraft having a rudder and means for actuating said rudder, of ground engaging means including a mounting member yieldably supported by said aircraft, releasable means operatively connecting said rudder actuating means with said ground engaging means for positive movement therewith through a predetermined range of angular departure from normal, adjustably yieldable frictional means for braking angular movement of said ground engaging means within said predetermined range of departure and means for automatically disengaging said releasable connecting means and said braking means by angular movement of said ground engaging means and said rudder actuating means beyond said predetermined range of departure.

3. The combination in an aircraft having a rudder and means for actuating said rudder, of ground engaging means, means operatively connecting said rudder actuating means with said ground engaging means for movement therewith through a predetermined range of angular departure from normal, means for automatically disengaging said rudder actuating means and said ground engaging means by angular movement of the aforesaid means beyond said predetermined range of departure, and means for braking angular movement of said ground engaging means only when the latter is operatively connected with said rudder actuating means.

4. The combination in an aircraft having a rudder and means for actuating said rudder, of ground engaging means, releasable means operatively connecting said rudder actuating means with said ground engaging means for positive movement therewith through a predetermined range of angular departure from normal, camming means for automatically disengaging said releasable means by angular movement of said ground engaging means and said rudder actuating means beyond said predetermined range of departure, means frictionally engaged with said rudder actuating means for imposing a braking action thereon against angular movement when operatively connected with said ground engaging means, and spring means for restoring the positive connection between said rudder actuating means and said ground engaging means by angular return of the aforesaid means within said predetermined range of departure and for simultaneously re-establishing said braking action.

5. A landing device comprising yieldably supported mounting means, a steering member carried by said mounting means, a ground engaging member including a part normally positively engaged by said steering member and movable therewith through a predetermined range of angular departure from normal, means between said steering member and said mounting means for retarding movement therebetween, and means for disengaging said steering member from said part and for rendering said retarding means inoperative upon predetermined relative displacement between said mounting means and said steering member from normal position.

6. A landing device comprising yieldably supported mounting means, a steering member carried by said mounting means, a ground engaging member including a part pivotally mounted in said mounting means and normally positively connected to said steering member and movable therewith through a predetermined range of angular movement, means between said steering member and said mounting means for retarding movement therebetween, means interposed between said mounting means and steering member operatively to disconnect said steering member from said part and said mounting means upon a relative displacement of said ground engaging member beyond said predetermined range, and additional means for restoring the positive connection between said steering member and said part upon angular movement of said ground engaging member within said predetermined range.

7. In a landing device for aircraft, a mounting means, a rudder operating member carried by said mounting means, a ground engaging member including a part pivotally mounting said ground engaging member for swiveling movement in said mounting means and being positively connected to said rudder operating member for movement therewith through a predetermined range of angular movement, means interposed between said mounting means and rudder member operating to automatically disconnect said members upon relative displacement thereof beyond said predetermined range, and further means frictionally engaging said rudder operating member for imposing a braking action thereon against angular movement only when operatively connected with said ground engaging member.

8. In a landing device for aircraft, a mounting means, a rudder operating member carried by said mounting means, a ground engaging member including a part pivotally mounting said ground engaging member for swiveling movement in said mounting means and means positively connected to said rudder operating member for movement therewith through a predetermined range of angular movement, means interposed between said mounting means and rudder member operating to automatically disconnect said member upon relative displacement thereof beyond said predetermined range, means frictionally engaging said rudder operating member for imposing a braking action thereon against angular movement when operatively connected with said ground engaging member, and spring means for restoring the positive connection between said rudder operating member and said ground engaging member upon angular displacement thereof within said predetermined range and for re-establishing said braking action.

9. In a tail wheel assembly for aircraft, a supporting means, a swingable member pivotally connected to said supporting means, shock absorbing means interposed between said supporting means and the swinging end of said member, a tail wheel including a tail post pivotally mounting said wheel for swiveling movement in said swingable member, a steering mast for the rudder of said aircraft, a releasable connection between said tail wheel and said steering mast operating to obtain a positive movement of said tail wheel through a predetermined range of angular movement of said steering mast, and a braking connection between said tail wheel and swingable member for retarding relative rotation therebetween, and means for rendering said connections automatically releasable upon departure of said tail wheel from said predetermined range, and permitting free swiveling action of said tail wheel.

10. In a tail wheel assembly for aircraft, a supporting means, a swingable member pivotally connected to said supporting means, shock obsorbing means interposed between said supporting means and the swinging end of said member, a tail wheel including a tail post pivotally mounting said wheel for swiveling movement in said swingable member, a steering mast adapted for actuating the rudder of said aircraft, means operatively connecting said tail post with said steering mast for conjoint movement therewith through a predetermined range of angular movement and frictionally engaging said swingable member for retarding rotation therebetween, and means associated with said last mentioned means for automatically disengaging said connections upon departure of said tail wheel from said predetermined range.

11. In a tail wheel assembly for aircraft, a supporting means, a swingable member pivotally connected to said supporting means, shock absorbing means interposed between said supporting means and the swinging end of said member, a tail wheel including a tail post pivotally mounting said wheel for swiveling movement in said swingable member, a rudder actuating mast carried by said swingable member, a releasable spline connection between said tail post and said mast operating to obtain a conjoint movement therebetween through a predetermined range of angular movement of said mast, friction means between said mast and said swingable member for retarding relative motion therebetween, cam actuated means associated with said swingable member for automatically disengaging said mast and tail post and disengaging said friction means upon relative displacement therebetween beyond said predetermined range, and spring means for restoring the connection between said tail post and steering mast upon angular movement thereof into said predetermined range.

12. In a tail wheel assembly for aircraft, a supporting means, a swingable member pivotally connected to said supporting means, shock absorbing means interposed between said supporting means and the swinging end of said member, a tail wheel including a tail post pivotally mounting said wheel for swiveling movement in said swingable member, a rudder actuating mast carried by said swingable member, a releasable spline connection between said tail post and said mast operating to obtain a conjoint movement therebetween through a predetermined range of angular movement of said mast, cam actuated means associated with said swingable member for automatically disengaging said mast and tail post upon relative displacement therebetween beyond said predetermined range, and means frictionally engaging said steering mast and a part of said swingable member for imposing a braking action against swiveling movement of said tail wheel only when the latter is operatively connected with said steering mast.

13. In a tail wheel assembly for aircraft, a supporting means, a swingable member pivotally connected to said supporting means, shock absorbing means interposed between said supporting means and the swinging end of said member, a tail wheel including a tail post pivotally mounting said wheel for swiveling movement in said swinging member, a rudder actuating mast carried by said swingable member, a releasable spline connection between said tail post and said mast operating to obtain a conjoint movement therebetween through a predetermined range of angular movement of said mast, cam actuated means associated with said swingable member for automatically disengaging said mast and said tail post upon relative displacement therebetween beyond said predetermined range, means frictionally engaging said steering mast and a part of said swingable member for imposing a braking action against swiveling movement of said tail wheel when the latter is operatively connected with said steering mast, and spring means for restoring the connection between said tail post and steering mast upon angular displacement thereof within said predetermined range and for simultaneously re-establishing said braking action.

14. In a tail wheel assembly for aircraft, a supporting means, a swingable member pivotally connected to said supporting means, shock absorbing means interposed between said supporting means and the swinging end of said member, a tail wheel including a tail post pivotally mounting said wheel for swiveling movement in said swingable member, a rudder actuating mast carried by said swingable member, a rudder actuating mast carried by said swingable member, a releasable spline connection between said tail post and said mast operating to obtain conjoint movement therebetween through a predetermined range of angular movement of said mast, cam actuated means associated with said swingable member for automatically disengaging said mast and tail post upon relative displacement therebetween beyond said predetermined range, means frictionally engaging said steering mast and a part of said swingable member for imposing a braking action against swiveling movement of said wheeel when the latter is operatively connected with said steering mast, and spring means for restoring the connection between said tail post and steering mast upon angular displacement thereof into said predetermined range and for simultaneously re-establishing said braking action, said last-mentioned means including parts capable of relative adjustment to control the amount of braking action applied to the swiveling movement of said tail wheel.

15. An integral wheel supporting knuckle comprising, an upper spindle portion, a lower wheel bearing portion and an intermediate knuckle portion, said knuckle portion being streamlined in cross-section substantially throughout its length and having each transverse section thereof tilted with its trailing edge presenting inwardly towards the wheel.

16. An integral wheel supporting knuckle comprising, an upper hollow spindle portion, a lower wheel bearing portion and an intermediate knuckle portion, said knuckle portion being streamlined in cross-section substantially throughout its length and having each transverse section thereof tilted with its trailing edge presenting inwardly towards the wheel.

17. In a landing gear for aircraft, means for supporting a ground engaging member, a retractable-extensible telescopic oleo strut including a piston member and a cylinder member, one of said members being adapted to be connected at its upper end to said aircraft and the other of said members having a housing at its lower end for rotatably supporting said supporting means, a steering element mounted on and rotatable with said ground engaging supporting means, means for remotely controlling said steering element, comprising a cable that extends upwardly a distance at least substantially equal to the length of the stroke of said strut, and means for taking up the slack of said cable during contraction of said strut.

18. In a landing gear for aircraft, means for supporting a ground engaging member, a retractable-extensible telescopic oleo strut including a piston member and a cylinder member, one of said members being adapted to be connected at its upper end to said aircraft and the other of said members having a housing at its lower end for rotatably supporting said supporting means, a steering element mounted on and rotatable with said ground engaging supporting means, means for remotely controlling said steering element, comprising a cable that extends upwardly a distance at least substantially equal to the length of the stroke of said strut, means for taking up the slack of said cable during contraction of said strut, and means responsive to a predetermined rotational movement of said supporting means for causing said steering element to be released from rotation with said supporting means.

19. In combination, a wheel supporting member, means for rotatably supporting said wheel supporting member, means between said member and said supporting means for retarding rotation of said member, and means operative in response to movement of said wheel supporting member for rendering said retarding means inoperative after a predetermined angle of rotation of said member.

20. In combination, a wheel supporting member, means for rotatably supporting said wheel supporting member, a steering element connected for rotation with and axially movable with respect to said wheel supporting member, means between said steering element and the means for rotatably supporting said wheel supporting member for retarding rotation of said wheel supporting member, and means operative in response to movement of said wheel supporting member for rendering said retarding means inoperative and for disconnecting said steering element from said wheel supporting member after a predetermined angle of rotation thereof from its normal position.

21. In combination, a wheel supporting member, means for rotatably supporting said wheel supporting member, a steering element connected for positive rotation with and axially movable with respect to said wheel supporting member, means between said steering element and the means for rotatably supporting said wheel supporting member for retarding rotation of said wheel supporting member, and means operative in response to movement of said wheel supporting member for rendering said retarding means inoperative after a pre-determined angle of rotation of said member.

22. In combination, a wheel supporting member, means for rotatably supporting said wheel supporting member, a steering element connected for positive rotation with and axially movable with respect to said wheel supporting member, means between said steering element and the means for rotatably supporting said wheel supporting member for retarding rotation of said wheel supporting member, and means between said means for rotatably supporting said wheel supporting member and said steering element operative in response to movement of said wheel supporting member for rendering said retarding means inoperative after a pre-determined angle of rotation thereof.

23. In combination, a wheel supporting member, means for rotatably supporting said wheel supporting member, a fitting connected for rotation with and axially movable with respect to said wheel supporting member, means between said fitting and the means for rotatably supporting said wheel supporting member for retarding rotation of said wheel supporting member, and means operative in response to movement of said wheel supporting member for rendering said retarding means inoperative after a predetermined angle of rotation of said wheel supporting member, said means serving further to disconnect said fitting from rotation with said wheel supporting member.

24. In a landing gear having a wheel supporting member, in combination with means for rotatably supporting a wheel supporting member, means for frictionally retarding rotation of said supporting member and means operative in response to movement of said wheel supporting member for rendering said retarding means inoperative after a predetermined angle of rotation of said supporting means relative to said wheel supporting member.

25. In a landing gear having a wheel supporting member, in combination with means for rotatably supporting a wheel supporting member, means for frictionally retarding rotation of said wheel supporting member and means rotatable with said wheel supporting member and operatively connected with supporting means for rendering said retarding means inoperative after a pre-determined relative angle of rotation between said supporting means and said member.

26. In a landing gear, in combination, a wheel supporting member having an engaging element, means for rotatably supporting said member, said means being provided with a friction surface and a coupling device having an engaging element and a friction surface respectively complemental to said first mentioned element and friction surface, said device being axially movable for effecting an engagement or disengagement between the complemental elements and surfaces.

27. In an airplane, in combination, ground engaging means, means for rotatably supporting said ground engaging means, steerable means, and means for detachably connecting said steerable means with said ground engaging means and with said supporting means in such a manner that said steerable means is rotatable with said ground engaging means through a predetermined range of departure from normal, and is supported by said supporting means and freed from movement with said ground engaging means by angular movement of the steering means beyond said predetermined range of departure, and means for dampening relative angular oscillating movements between said ground engaging means and said supporting means, and means for disengaging said dampening means operated by movement of the ground engaging means beyond the predetermined range.

28. In an airplane, in combination, ground engaging means, means for rotatably supporting said ground engaging means, steerable means, and means for detachably connecting said steerable means with said ground engaging means and with said supporting means in such a manner that said steerable means is rotatable with said ground engaging means through a predetermined range of departure from normal, and is supported by but relatively movable angularly with respect to said ground engaging means by angular movement of the steering means beyond said predetermined range of departure, and friction means to prevent shimmying of said ground engaging means relative to its support, and means for disengaging said friction means operated by movement of the ground engaging means beyond the predetermined range.

29. In an airplane, in combination, ground engaging means, means for rotatably supporting said ground engaging means, steerable means, means for detachably connecting said steerable means with said ground engaging means and with said supporting means in such a manner that said steerable means is rotatable with said ground engaging means through a predetermined range of departure from normal, and is supported by said supporting means and free from movement with said ground engaging means by angular movement of the steering means beyond said predetermined range of departure, and means operatively associated with said steering means and said supporting means for dampening relative angular oscillating movements between said ground engaging means and said supporting means, and means for disengaging said dampening means operated by movement of the ground engaging means beyond the predetermined range.

30. A steerable wheel supporting knuckle comprising, an upper hollow spindle portion, a lower wheel bearing portion and an intermediate knuckle portion, said knuckle portion being streamlined in cross-section substantially throughout its length and having each transverse section thereof tilted with its trailing edge presenting inwardly towards the wheel.

JEAN ALFRED ROCHÉ.